US009471282B2

(12) United States Patent
Arpana et al.

(10) Patent No.: US 9,471,282 B2
(45) Date of Patent: Oct. 18, 2016

(54) SYSTEM AND METHOD FOR USING ANNOTATIONS TO AUTOMATICALLY GENERATE A FRAMEWORK FOR A CUSTOM JAVASERVER FACES (JSF) COMPONENT

(75) Inventors: Erukala Arpana, Hyderabad (IN); Amit Chaturvedi, Hyderabad (IN)

(73) Assignee: CA, Inc., New York, NY (US)

( * ) Notice: Subject to any disclaimer, the term of this patent is extended or adjusted under 35 U.S.C. 154(b) by 2144 days.

(21) Appl. No.: 11/689,276

(22) Filed: Mar. 21, 2007

(65) Prior Publication Data
US 2008/0235661 A1    Sep. 25, 2008

(51) Int. Cl.
G06F 9/44    (2006.01)
G06F 9/45    (2006.01)

(52) U.S. Cl.
CPC .. *G06F 8/30* (2013.01); *G06F 8/24* (2013.01)

(58) Field of Classification Search
None
See application file for complete search history.

(56) References Cited

U.S. PATENT DOCUMENTS

| 7,246,134 B1 * | 7/2007 | Kitain et al. | 707/999.102 |
| 7,565,364 B1 * | 7/2009 | Darcy et al. | 707/999.001 |
| 2003/0023957 A1 * | 1/2003 | Bau et al. | 717/140 |
| 2007/0033595 A1 * | 2/2007 | Carr et al. | 719/328 |
| 2007/0074124 A1 * | 3/2007 | Farn | G06F 9/4443 715/760 |
| 2012/0124550 A1 * | 5/2012 | Nocera et al. | 717/104 |

OTHER PUBLICATIONS

Richard Hightower, "JSF for Nonbelievers: JSF Component Development", Jul. 26, 2005, IBM developerWorks, retrieved from: http://www.ibm.com/developerworks/java/library/j-jsf4/.*
"Getting Started with the Annotation Processing Tool (apt)", Copyright 2004, Sun Microsystems, Inc., printed from <http://java.sun.com/i2se/1.5.0/docs/guide/apt/GettingStarted.html>, printed from Internet Jul. 3, 2006, 8 pages.
Holmgren, Anders, "Using Annotations to Add Validity Constraints to JavaBeans Properties", Mar. 2005, copyright © Sun Microsystems, Inc., printed from Internet Jul. 3, 2006, 14 pages.

* cited by examiner

*Primary Examiner* — Adam Lee
(74) *Attorney, Agent, or Firm* — Pillsbury Winthrop Shaw Pittman LLP

(57) ABSTRACT

A system and method for using annotations to automatically generate a framework for a custom JavaServer Faces (JSF) component is provided. Source code for a custom JSF Component class may be received, where the received source code may include annotations indicating how a declared element should be processed. For example, based on a type of annotation in the source code, the framework for the custom JSF component may be automatically generated, where the generated framework can include implementations for a Component class, a Tag Handler class, a Renderer class, a Tag Library Descriptor, a faces-config.xml file, tag unit test cases, or any other aspect of a custom JSF component. Thus, reusable, reliable, and readable custom JSF components may be easily developed at a substantially reduced development cost.

20 Claims, 3 Drawing Sheets

SYSTEM AND METHOD FOR USING ANNOTATIONS TO AUTOMATICALLY GENERATE A FRAMEWORK FOR A CUSTOM JAVASERVER FACES (JSF) COMPONENT

FIELD OF THE INVENTION

The invention relates to automatically generating a custom object-oriented framework, and in particular, to using annotations to automatically generate a framework for a custom JavaServer Faces (JSF) component.

BACKGROUND OF THE INVENTION

Software engineering and other development projects often involve a great deal of developer expertise. Before a final software product is ever released, engineers often spend significant resources developing framework components for an end product. For example, source code is often developed for various modules or other components that define distinct units of software to be compiled or otherwise assembled into an end product. Each such component will typically require substantial time and resources to develop and test before being deployed. Developing any given component may present various challenges, including proper implementation of various operations, methods, functions, and syntax, as well as maintaining proper formats and documentations, among other things. Thus, developing any given software product may involve various potential pitfalls. Furthermore, various components can often share similar characteristics, making manual development of all source code a potentially redundant and resource wasting process.

Accordingly, software developers often utilize various libraries, development tools, or other packages to simplify some aspects of component development. For example, when designing a web page or a web application, a developer may implement various user interface components, among other things. Implementing such user interface components may be simplified by using JavaServer Faces (JSF) technology, which offers a set of application program interfaces for representing user interface components, managing their state, handling events, validating inputs, or defining page navigation, among other things. JSF technology includes standardized, reusable user interface components that encapsulate functionality, without being constrained to any client-specific presentation. As such, a user interface component created using JSF can be rendered to any suitable client device. For example, JSF can be used to create custom user interface components by developing a custom Renderer to define rendering for the custom user interface component (e.g., decoding input, encoding output, etc.). As such, developers can construct custom tags (e.g., HTML tags, XML tags, etc.) for various particular implementations.

Although libraries, packages, or other technologies can simplify some aspects of software development (e.g., by providing standard or reusable components), creating custom components often still necessitates manual implementation of various features of a framework for the custom components. For instance, to develop a custom JSF component, an engineer may have to manually implement, among other things, a Component class, a Tag Handler class, a Renderer class, a Tag Library Descriptor (TLD), as well as test units to verify the implementation, as well as configuration files to register the custom component. Having developers create source code manually, however, will continue to subject development projects to the pitfalls described above, among others. For instance, as a result of manual code development, a propensity of human error may increase (e.g., typographical errors can lead to hours of debug time to identify mistakes, especially in larger projects, configuration files may include inappropriate definitions, or other errors may occur); code may be non-uniform or indecipherable (e.g., any given developer may have a unique style for documenting, commenting, formatting, indenting, or otherwise implementing code); or resource deployment may be redundant (e.g., resources may be wasted on developing simple code blocks, various developers may implement the same or similar components, etc.).

Existing systems suffer from these and other problems.

SUMMARY OF THE INVENTION

According to various aspects of the invention, a system and method for using annotations to automatically generate a framework for a custom JavaServer Faces (JSF) component may address these and other drawbacks of existing systems. For example, annotations may be used to simplify development of customized JSF components by reducing an amount of time needed to develop the components, minimizing resource utilization during development, providing a focused framework for developing components, integrating other object-oriented systems with annotations and JSF, as well as providing reusable, reliable, and readable source code, among other things.

According to various aspects of the invention, an annotated Component class may be used to automatically generate a framework for a custom JSF component. For example, the Component class may be implemented by annotating source code defining any variables, attributes, parameters, or other characteristics of the custom JSF component. The annotated source code may be received (e.g., by an annotation processor factory), and one or more annotations may be identified in the received source code. The identified annotations may be processed (e.g., by the annotation processor factory) to automatically generate the framework for the custom JSF component.

According to various aspects of the invention, the generated framework for the custom JSF component may include, among various other things, a Tag Handler class, a Tag Library Descriptor (TLD), a configuration file, a Renderer class, value binding expressions, or test modules, thereby enabling use of the custom JSF component (e.g., in an application, a JavaServer Pages (JSP) environment, or otherwise). For example, to use the custom JSF component in a JSP environment, a TLD may associate the Tag Handler class with a callable tag (e.g., an XML tag). Further, the Tag Handler class may implement functionality of the tag, thereby enabling use of the custom JSF component in the JSP environment. Further, the configuration file (e.g., an XML configuration file, such as faces-config.xml) may include an entry that registers the custom JSF component for use in any suitable application. Moreover, the generated framework may include a Renderer class having a default decode method for interpreting inputs related to the custom JSF component, as well as various methods for handling value binding expressions (e.g., getter and setter methods for variables, attributes, or parameters associated with the custom JSF component). The framework may also include at least one module (e.g., a tag unit test case) for testing the generated framework.

DETAILED DESCRIPTION

Figure 1:
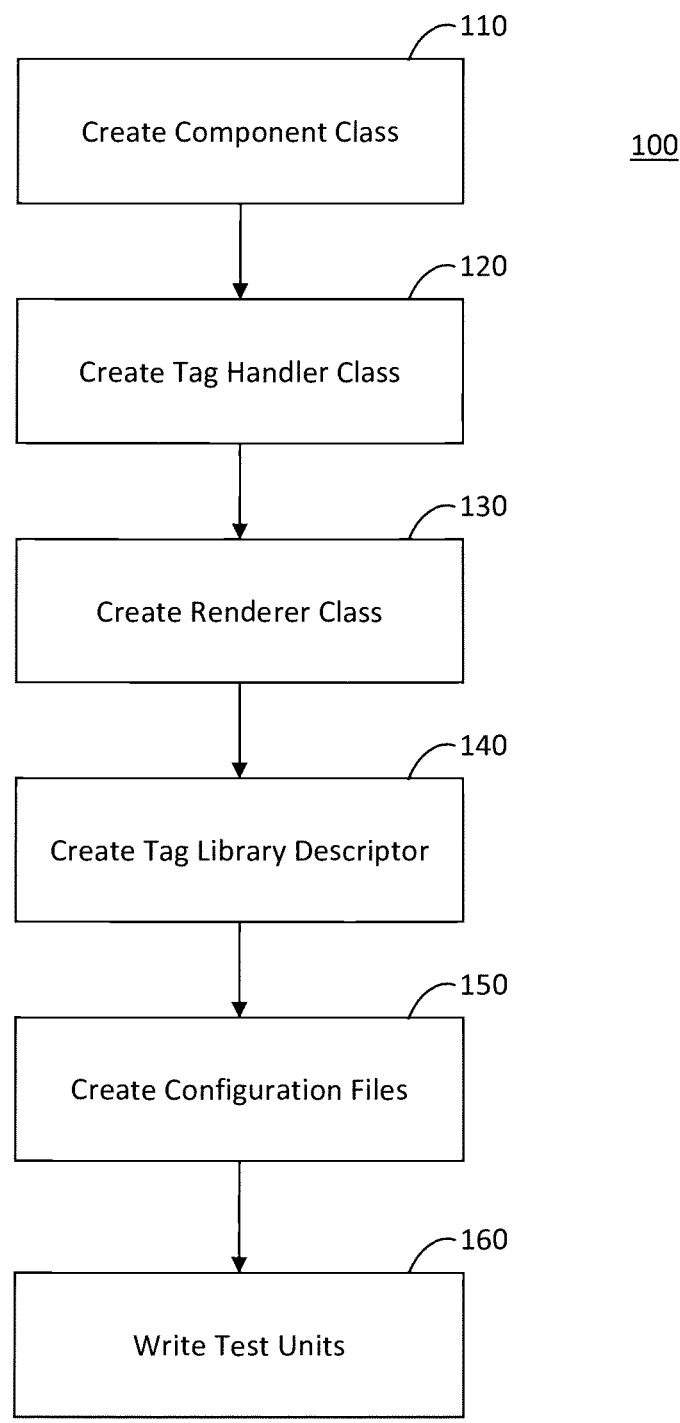
FIG. 1 illustrates a flow diagram of an exemplary method for developing a framework for a custom JavaServer Faces (JSF) component according to various aspects of the invention.

Referring to FIG. 1, an exemplary method 100 for developing a custom JavaServer Faces (JSF) component is illustrated according to various aspects of the invention. JSF technology may be used, for example, to simplify various tasks related to building JavaServer applications, web applications, or other suitable applications. For instance, among other things, JSF may provide various reusable components (e.g., user interface components, data conversion components, etc.), which can be connected to various application data sources or application program interfaces for representing components, managing component states, handling client events, invoking server-side event handling, validating inputs, or navigating pages, among others. Further, JSF provides a framework for creating, extending, modifying, or otherwise customizing various aspects of JSF components or sub-components (e.g., a custom validation method may be developed for any given component, instead of requiring implementation of an entirely new component). As such, it will be apparent that creating custom JSF components or sub-components may require developers, software engineers, or others to manually perform various development tasks when creating a JSF component framework.

For example, as shown in FIG. 1, developing a custom JSF component may include, among other things, creating a Component class in an operation 110, creating a Tag Handler class in an operation 120, creating a Renderer class in an operation 130, creating a Tag Library Descriptor (TLD) in an operation 140, or creating a faces-config.xml configuration file in an operation 150, in addition to writing test units for the created JSF elements. It will be apparent, however, that implementation choices and particular development tasks may vary from one example to another. Accordingly, although JSF may possess various customizable characteristics to increase flexibility thereof, creating a custom JSF component may still require a certain degree of skill and precision for proper manual implementation.

Among other things, creating a custom JSF component or sub-component may include creating a Component class in operation 110. For example, the created Component class may define the custom component's functionality, variables, attributes, parameters, or other characteristics. The Component class may be developed or otherwise implemented in source code as a Java class extending, overriding, or otherwise customizing various aspects of an abstract Component class (e.g., a base class or a super class). For example, the Component class may be a Java class derived from UIComponentBase, or extended from an existing JSF UIComponent (e.g., outputText), or any other suitable component base class, as will be apparent.

As such, the created Component class may define primary logical characteristics of a custom JSF component being created. To this end, a developer may specify any number of variables, attributes, parameters, or other elements to be supported by the custom component, as well as getter and setter methods for each of the variables, attributes, parameters, or other elements. Further, the getter methods should include value-binding expressions for the customized variables, attributes, parameters, or other elements (e.g., to automatically instantiate an object, override default values, traverse object trees, perform synchronization, etc.). Thus, a component model may be updated by saving and restoring states for the various variables, attributes, parameters, or other elements, and by overriding various framework methods to customize the component. For instance, the custom Component class may define custom forms and other user interface components, synchronized content, or events to trigger for a data model, among various other things. It will be apparent, further, that creating a Component class can depend on various implementation choices and other issues, requiring technical expertise and close attention to detail to create customized JSF components.

Furthermore, in various instances, custom JSF components may be developed for deployment in a particular environment (e.g., a JavaServer Pages (JSP) environment). Thus, developing a custom JSF component may include creating a Tag Handler class in operation 120, where the Tag Handler class may associate the custom component with a callable tag (e.g., a JSP callable tag) and/or a Renderer (e.g., as described below), or to set properties of the component, among other things. Thus, creating a Tag Handler class in operation 120 may include various implementation issues, including, among other things, defining various variables, attributes, parameters, or other elements to be supported by the custom component, providing setter methods for the defined variables, attributes, parameters, or other elements, overriding a setProperties( ) method of a super class to set values for the component implementing the defined tag, performing any tasks necessary for a tag lifecycle (e.g., doStart( ), release( ), or other lifecycle tasks), and/or overriding unimplemented methods of the super class to identify a Component class and a Renderer class associated with the tag.

While a JSF Component class may define a component's state and behavior, among other things, a Renderer often defines how to decode input and/or encode output in order to properly display a component to a client device. Thus, in operation 130, a Renderer class may be created to normalize, interpret, or otherwise decode incoming values, and to normalize, convert, or otherwise encode component output values into an appropriate markup (e.g., HTML, XML, etc.). The Renderer can be created as a separate class and linked to a component through a Component class or a Tag Handler class, or in various implementations, Renderer logic can be implemented within the Component class or Tag Handler class. The Renderer logic can provide various flexible renderings for a given component. For example, the Renderer logic can define a custom command component as a button, a hyperlink, or otherwise. In another example, the Renderer logic can provide various rendering options for a component depending on a type of client invoking the component (e.g., browsers, personal digital assistants, etc.). Thus, a developer may implement an encode( ) method, or other suitable logic, to handle displaying or otherwise encoding data to a client device. Further, custom component may implement various encode( ) methods to handle encoding for various client types, thereby enabling deployment of a custom JSF component to any suitable client device. The Renderer may further include a decode( ) method that interprets or otherwise decodes incoming values (e.g., client requests). For example, the decode( ) method may retrieve a request map from an external context, retrieve a client identifier to accept incoming parameter values, or set component parameter values to the incoming parameter values, among other things, as will be apparent.

Further, in various implementations, the custom JSF component may be used as part of a JSP page or other suitable application. As such, a TLD may be created in operation 140 to define usable tag attributes, where the TLD may reference the Tag Handler class created in operation 120, among other things. For instance, custom Tag Handlers (e.g., as created in operation 120) must be declared in a TLD before being redistributed or otherwise usable in a JSP environment. The TLD may be an XML document containing information about each custom tag, and may be used by a web container to validate the tags. General framework requirements for a TLD will be apparent, as such files may have certain naming conventions or packaging requirements, required root elements or schema specifications, or tag entries for associated Tag Handler classes, among other characteristics.

In addition to the substantial development tasks highlighted above, implementing a custom JSF component may further include associating various helper classes or implementing custom helper classes, including converters, validators, listeners, or other helper classes, without limitation, which can be bound to any given custom JSF component. For instance, a custom component taking a string as an input may be associated with a length validator that constrains a length of the string. It will be apparent, however, that validators or other helper classes may be defined in various different ways, potentially introducing significant challenges in maintaining consistency through manual implementation.

Upon defining all logical aspects of a custom JSF component, the custom component must be registered or otherwise associated with a faces-config.xml configuration file in operation 150. The faces-config.xml configuration file may be created or modified to include an entry for the custom component and any associated Renderer(s), thus making the custom component ready for use. Before using the custom component in a deployed application, however, thorough error-checking and debug processes may be implemented by creating test units in operation 160. For instance, the test units may be written to verify tag-units, component properties, Renderer properties, or other characteristics of the developed component. Thereafter, when all properties of the custom developed component have been tested and verified, the custom component may be ready for use in an application. Accordingly, it will be apparent that manually implementing a custom JSF component may involve various issues susceptible to human error. Further, a significant amount of resources may be wasted by requiring developers spend time and effort implementing and organizing framework components, resources which may be spent more optimally on implementing other interfaces and modules that may actually make use of the custom components.

Figure 2:
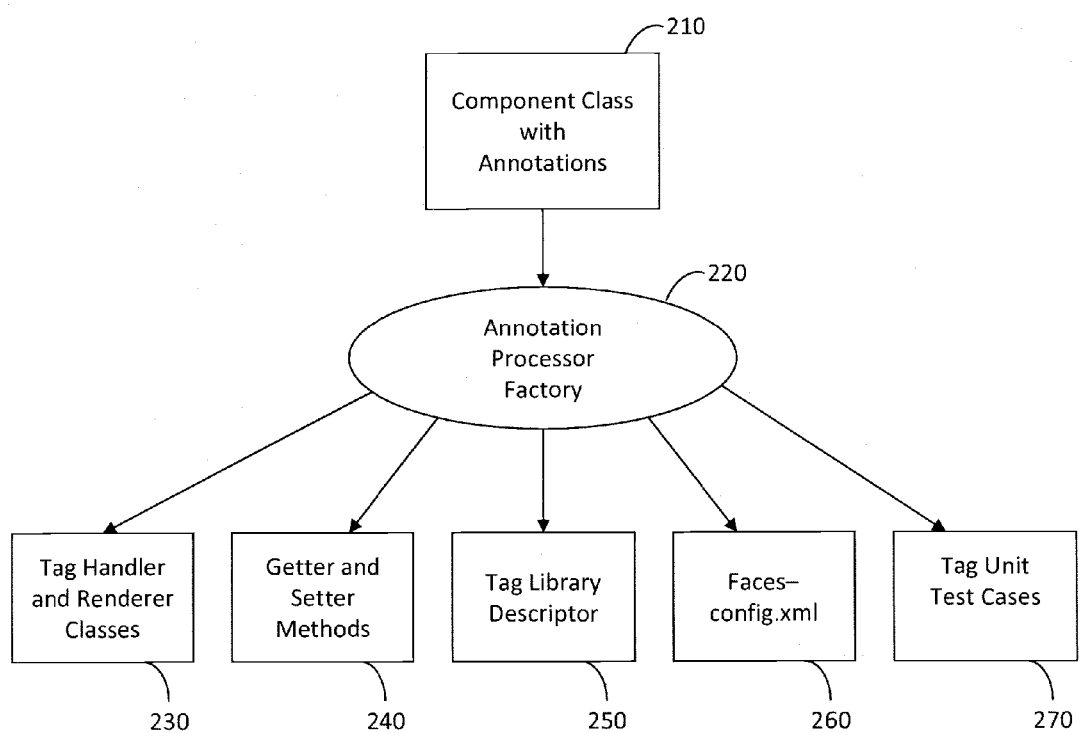
FIG. 2 illustrates a schematic diagram of an exemplary framework for using annotations to automatically generate a framework for a custom JSF component according to various aspects of the invention.

Referring to FIG. 2, a schematic diagram of an exemplary system 200 for using annotations to automatically generate a framework for a custom JSF component is illustrated according to various aspects of the invention. System 200 may provide several advantages over manual implementation, where annotations may be used to easily create custom JSF components by automatically generating a framework that includes a Tag Handler class, a Renderer class, a TLD, a faces-config.xml file, or unit test cases, among other things. For instance, to automatically generate a framework for a custom JSF component, a developer may simply implement source code for an annotated Component class, as described below.

As described above in reference to FIG. 1, developing a custom JSF component may involve various repetitive tasks, such as implementing boilerplate and structured modules (e.g., registering a custom component in a faces-config.xml configuration file may be entirely dependent on syntax and other characteristics of other aspects of the custom component). As such, various aspects of a custom JSF component framework may be automatically generated by identifying core JSF custom component development tasks, and automating various processes that may be dependent thereon. The core development tasks may be structured around custom annotations that provide a meta model (i.e., data that describes a data model) for the framework being developed. For example, a framework for a custom JSF component may include class files, a faces-config.xml configuration file, and test units, among other things, as described in FIG. 1 (e.g., a Component class, a Renderer class, a Tag Handler class, helper classes, a TLD, etc.). Many of the described framework pieces, however, can be characterized as interdependent, such that custom annotations may be defined to indicate how to compile, interpret, or otherwise process a given source element (e.g., annotated fields, methods, classes, etc.).

Thus, according to various aspects of the invention, a framework for a custom JSF component may be automatically generated using annotations. A developer may implement an annotated custom Component class 210, where the annotations may include field level annotations, class level annotations, or others, as described in greater detail below. An annotation processor factory 220 may include a set of reflective application program interfaces and supporting infrastructure to identify, read, or otherwise process annotations from received source files. The reflective application program interfaces may provide a build-time, source-based, read-only view of a program structure, wherein annotation processor factory 220 may read the annotations from an incoming source file 210 at compile-time, reflectively at run-time, or otherwise, as will be apparent. As such, a set of custom annotations may be defined for a custom JSF component framework, where the custom annotations may enable annotation processor factory 220 to cleanly model any suitable type system (e.g., a custom JSF component framework).

Annotations can affect how annotation processor factory 220 processes incoming code, and therefore, annotations may affect semantics, structure, documentation, organization, functionality, or any other suitable characteristic of generated files or other aspects of a custom JSF component framework. Further, because annotation processor factory 220 uses a set of reflective application program interfaces, annotations for common attributes can optionally be provided only in base files (e.g., a source file for annotated Component class 210). Thus, the base file can contain any or all meta-information (i.e., by way of annotations) for generating or deriving new source files, faces-config.xml configuration file, or other aspects of the framework in a logical, consistent manner. Accordingly, annotation processor factory 220 may receive annotated source code that defines a Component class 210 for a custom JSF component. The annotations may instruct annotation processor factory 220 as to how to generate the custom JSF component framework, including how to implement various code attributes, generate or populate derived files, or otherwise generate aspects of the framework.

As shown in FIG. 2, annotation processor factory 220 may be configured to process annotations that define how to automatically generate a framework for custom JSF components. For example, in various implementations, the annotations may define how to automatically generate a custom JSF component framework that includes Tag Handler and Renderer classes 230, getter and setter methods 240 for various variables, attributes, parameters, or other elements, a TLD 250, a faces-config.xml configuration file 260, or tag unit test cases 270, among other things. For instance, the following sample source code illustrates an exemplary annotation that can be used to automatically generate validator tags for use in a faces-config.xml configuration file 260 associated with a custom JSF component:

```
package com.ca.corpui.faces.annotation.atype.facesconfig;
    public @interface Validators {
        String validatorId( ) default "ID_VALIDATOR";
        String validatorClass( );
    }
```

In the above example, the @Validators annotation may be processed by annotation processor factory 220, which automatically creates validator tags to include in a faces-config.xml configuration file 260 for a custom JSF component. Default values may be assigned to a field, method, or otherwise, as shown above where a default value for validatorId may be "ID_VALIDATOR." Further, the validatorClass field may be used when using the @Validators custom annotation to annotate a class.

It will be apparent that various other custom annotations can be processed by annotation processor factory 220 to automatically generate various aspects of a custom JSF component framework, wherein the custom annotations, once defined, may be used to annotate any suitable declaration. Annotations may be considered a special type of modifier, where annotations conventionally precede other modifiers (e.g., public, static, final, etc.), and can be used anywhere that other modifiers can be used. Thus, according to various aspects of the invention, annotation processor factory 220 may automatically generate a framework for a custom JSF component using only annotated source code for a custom JSF Component class 210. For example, the following sample source code provides a portion of a custom JSF Component class that includes exemplary fields annotated with an @AddtoTagClass annotation:

```
private static String SUBMIT = "submit";
    @AddtoTagClass( )
    private String type = SUBMIT;
    @AddtoTagClass( )
    private Integer tabIndex = null;
    @AddtoTagClass( )
    private String accessKey = null;
```

In the above example, the custom annotation @AddtoTagClass annotates the fields type, tabindex, and accesskey. Annotation processor factory 220 may claim the custom @AddtoTagClass annotation and may automatically generate a Tag Handler class 230 for the declared variables, attributes, parameters, or other elements, along with getter methods, setter methods, and setProperties methods 240 for the declared variables, attributes, parameters, or other elements. For example, annotation processor factory 220 may process the @AddtoTagClass annotation by automatically generating the following exemplary Tag Handler class source code, which includes getter methods, setter methods, and setProperties methods for the annotated variables, attributes, parameters, or other elements, among other things:

```
package com.ca.corpui.faces.taglib.html;
import javax.faces.component.UICommand;
import javax.faces.component.UIComponent;
import javax.faces.context.FacesContext;
import javax.faces.el.ValueBinding;
import javax.faces.webapp.UIComponentTag;
import javax.servlet.jsp.JspException;
import com.ca.corpui.faces.CAFacesConstants;
import com.ca.corpui.faces.components.Button;
import com.ca.corpui.faces.components.CAUICommand;
import com.ca.corpui.faces.components.CAUIComponentConstants;
import com.ca.corpui.faces.components.html.HtmlButton;
import com.ca.corpui.faces.renderkit.html.HtmlButtonRenderer;
import com.ca.corpui.faces.util.MessageUtil;
public class HtmlButtonTag extends UIComponentTag {
    public HtmlButtonTag( ) {
        super( );
    }
    private String type = null;
    private String tabIndex = null;
    private String accessKey = null;
    public void setAccessKey(String accessKey) {
        this.accessKey = accessKey;
    }
    public void setTabIndex(String tabIndex) {
        this.tabIndex = tabIndex;
    }
    public void setType(String type) {
        this.type = type;
    }
    public String getComponentType( ) {
        return HtmlButton.COMPONENT_TYPE;
    }
    public String getRendererType( ) {
        return HtmlButtonRenderer.RENDERER_TYPE;
    }
    protected void setProperties(UIComponent component) {
        super.setProperties((CAUICommand)component);
        Button buttonComponent = null;
        try {
            buttonComponent = (Button)component;
        } catch (ClassCastException cce) {
            throw new IllegalStateException(MessageUtil.-
                getMessage(CAFacesConstants.-
                INVALID_STATE_MESSAGE_ID, new Object[ ]
                {component.toString( ),
                UICommand.COMPONENT_TYPE}).getSummary( ));
        }
        if (type != null) {
            if (isValueReference(type)) {
                ValueBinding vb = FacesContext.getCurrentInstance( ).-
                    getApplication( ).createValueBinding(type);
                buttonComponent.-
                    setValueBinding(CAUIComponentConstants.TYPE, vb);
            } else {
                buttonComponent.setType(type);
            }
        }
        if(tabIndex != null) {
            if (isValueReference(tabIndex)) {
                ValueBinding vb = FacesContext.getCurrentInstance( ).-
                    getApplication( ).createValueBinding(tabIndex);
                buttonComponent.-
                    setValueBinding(CAUIComponentConstants.TABINDEX, vb);
            } else {
                buttonComponent.setTabIndex(new Integer(tabIndex));
            }
        }
        if (accessKey != null) {
            if (isValueReference(accessKey)) {
                ValueBinding vb= FacesContext.getCurrentInstance( ).-
```

```
        getApplication( ).createValueBinding(accessKey);
        buttonComponent.
            setValueBinding(CAUIComponentConstants.ACCESSKEY, vb);
    } else {
        buttonComponent.setAccessKey(accessKey);
        }
    }
}
public int doEndTag( ) throws JspException {
    int val = super.doEndTag( );
    release( );
    return val;
}
public void release( ){
    type = null;
    tabIndex = null;
    accessKey = null;
    super.release( );
    }
}
```

In another example, the following source code provides an exemplary class level annotation using the @Validators annotation described above:

```
package com.ca.corpui.faces.validator;
import javax.faces.component.StateHolder;
    @Validators(validatorid=
    "com.ca.corpui.faces.validator.DoubleRangeValidator",
        validatorClass=
        "com.ca.corpui.faces.validator.DoubleRangeValidator")
public class TestValidator implements Validator, StateHolder {
    public void validate(FacesContext arg0, UIComponent arg1) {
        // To Do: Automatically Generated Method Stub
    }
    public Object saveState(FacesContext arg0) {
        // To Do: Automatically Generated Method Stub
        return null;
    }
}
```

In the above example, annotation processor factory 220 may claim the @Validators annotations, and may process the claimed annotations by automatically generating Validator tags in a faces-config.xml configuration file 260 (e.g., faces-config.xml), as shown in the following code sample:

```
    <validator>
        <validator-id> com.ca.corpui.faces.validator.-
        DoubleRangeValidator </validator-id>
        <validator-class> com.ca.corpui.faces.validator.-
        DoubleRangeValidator </validator-class>
    </validator>
```

Thus, according to various aspects of the invention, annotation processor factory 220 may process various custom annotations included in source code for a custom JSF Component class. That is, annotation processor factory 220 may claim any such annotations, and may automatically generate source code, complementary files, or various other aspects of a custom JSF component framework. As such, the invention may be used to automatically generate a custom JSF component framework, which would otherwise have to be developed manually. Accordingly, various aspects of the framework may be wholly consistent with one another, may be cleanly structured and documented, and may be free of many easily avoided errors (e.g., spelling mistakes, inappropriate definitions in a faces-config.xml configuration file, etc.), among other things. Moreover, by automatically generating the framework for custom JSF components, development resources may be redirected away from building low-level infrastructure, and towards developing more sophisticated applications using reusable, reliable, and readable custom JSF components.

Figure 3:
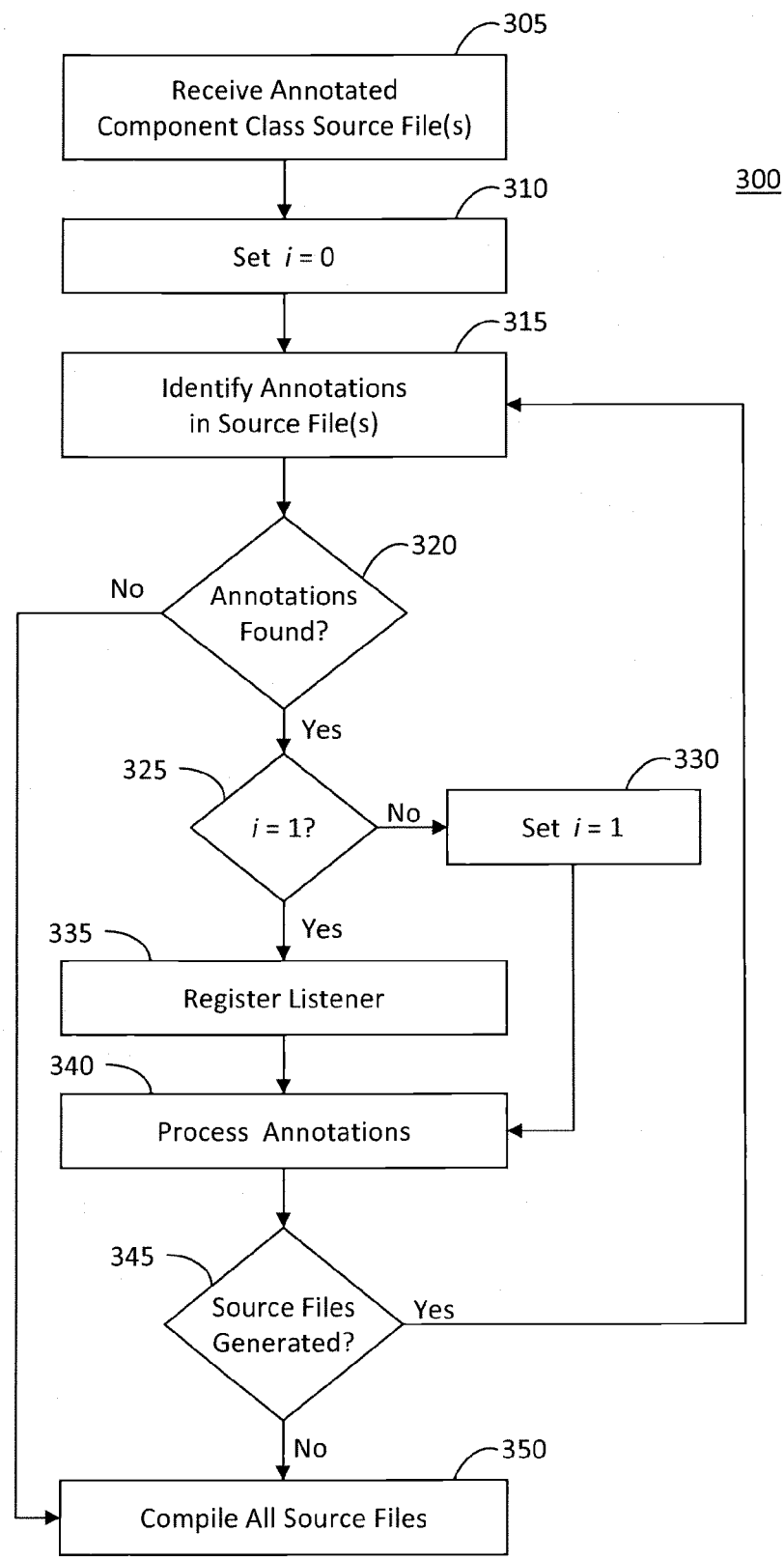
FIG. 3 illustrates a flow diagram of an exemplary method for using annotations to automatically generate a framework for a custom JSF component according to various aspects of the invention.

Referring to FIG. 3, a flow diagram of an exemplary method 300 for using annotations to automatically generate a framework for a custom JSF component is illustrated according to various aspects of the invention. Method 300 may begin in an operation 305, where at least one annotated source file may be received. The received source file may include source code that defines a custom JSF Component class, including any variables, attributes, parameters, or other elements to be implemented in a target custom JSF component. Further, the source code for the custom JSF Component class may include various annotations for the variables, attributes, parameters, or other elements being implemented, where the annotations may be used to automatically generate a framework for the target custom JSF component.

An annotation processor factory may process the annotated source code received in operation 305. The annotation processor factory may be invoked using any suitable technique, as will be apparent. For example, in various implementations, a command line interface may include an annotation processing tool that locates annotations in the received source file. Upon locating an annotation for automatically generating a custom JSF component framework, the annotation processing tool may trigger execution of the annotation processor factory in an operation 310. The annotation processor factory may iteratively process the source code received in operation 305, and as such, operation 310 may include setting an iteration counter to zero prior to a first processing iteration. It will be apparent, however, that execution of the annotation processor factory may be triggered in any suitable manner.

In an operation 315, the annotation processor factory may process the received source code by identifying any appropriate annotations that may be present in the source code. For example, the annotation processor factory may search the source code for annotations that may be used to automatically generate a framework for a custom JSF component. Subsequently, a decisional operation 320 may include determining whether any such annotations have been found, where if no annotations for generating custom JSF components can be located, processing may proceed to an operation 350, where all sources files may subsequently be compiled or otherwise prepared for deployment.

When annotations for automatically generating a custom JSF component framework can be found, however, decisional operation 320 may branch to an operation 325, where the annotation processor factory continues execution. Operation 325 may further include a decisional operation of determining a value for the iteration counter. When decisional operation 325 determines the value of the iteration counter to be other than one (i.e., a current iteration is a first iteration), the iteration counter may be set to one in an operation 330, and the annotation processor factory may subsequently process the annotations in an operation 340.

To process the annotations in operation 340, the annotation processor factory may determine a type of each annotation. Based on the determined type, the annotation processor factory may automatically perform any appropriate processing. The annotation processor factory may support various annotations, which may be processed to automatically generate a framework for a custom JSF component. For example, the annotation processor factory may support annotations for automatically generating getter methods, setter methods, setProperties methods, or other aspects of the annotated Component class. Further, various variables, attributes, parameters, overridden super class methods, or other elements of the Component class may be automatically generated by using appropriate annotations. Moreover, supported annotations may be used to automatically generate a Renderer class skeleton, as well as a default decode method for the generated Renderer class (e.g., based on core JSF component behavior, such as a component being extended or otherwise customized). Thus, a developer need only implement an encode method for the component, as the Renderer class and the decode method may be automatically generated. Various other annotations may be supported as well, as will be apparent, such that an automatically generated custom JSF component framework may further include a Tag Handler class, a TLD, a faces-config.xml configuration file, or tag unit test cases, among various other things. As such, in operation 340, the annotation processor factory may modify the received Component class source (e.g., by generating getter methods, etc.), and may further generate various new source files (e.g., for the Tag Handler class, the Renderer class, the TLD, etc.), or may generate various other aspects of a framework for a custom JSF component.

Once all of the annotations identified in operation 315 have been suitably processed by the annotation processor factory in operation 340, a decisional operation 345 may include determining whether the annotation processor factory generated any new source files. For example, as described above in reference to FIG. 2, processing an @AddtoTagClass annotation may result in a Tag Handler class being automatically generated. If no new source files have been generated, processing may proceed to operation 350 where all sources files may subsequently be compiled or otherwise prepared for deployment. When new source files have been generated, however, a recursive round of processing may occur, where processing may return to operation 315 for identifying any annotations in the source files. For instance, the source files generated in operation 345 during an initial iteration may include additional annotations that necessitate further processing. Thus, in subsequent iterations, decisional operation 325 may branch to an operation 335, where the annotation processor factory may register a listener. Even when the annotation processor factory does not need to process any of the additional annotations, the registered listener may be used to determine information about a status of a current iteration, whether any errors occur, or whether any new source files have been generated (e.g., to maintain consistency, linkage between components, etc.), among other functions. After an iteration where no new source files have been generated, decisional operation 345 may branch to operation 350, where a reusable framework for a custom JSF component has been fully generated based on annotated Component class source code.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A method to create a custom JavaServer Faces (JSF) component, the method comprising:
receiving annotated source code that defines a component class for the custom JSF component of a JSF application, the annotated source code being Java code of a Java class that defines behavior of a user interface element in a web page, the custom JSF component being callable by a custom tag in a markup language document at least in part defining the web page, the annotated source code including a Java annotation designated by an @ symbol prefix corresponding to a renderer; and
creating the custom JSF component, at least in part, by:
identifying the annotation in the received source code; and
in response to identifying the annotation, automatically generating a default decode method of the renderer that interprets inputs related to the custom JSF component and associating the renderer with the custom JSF component in a faces-config.xml file of the JSF application without manually adding a reference to the custom JSF component to the faces-config.xml file of the JSF application.

2. The method of claim 1, wherein automatically generating the custom JSF component comprises generating a framework for the custom JSF component and automatically adding a reference to the custom JSF component to the faces-config.xml file.

3. The method of claim 1, wherein the source code comprises another annotation identifying a data validator to validate inputs to the web page via the user interface element of the custom JSF component, and wherein automatically generating the custom JSF component comprises automatically registering the data validator as a validator usable to the JSF application in response to identifying the other annotation in the source code.

4. The method of claim 1, wherein the source code comprises another annotation corresponding to a renderer, and wherein automatically generating the custom JSF component comprises automatically associating the renderer with the custom JSF component in response to identifying the other annotation in the annotated source code.

5. The method of claim 1, wherein creating the custom JSF component comprises accessing a reflective application program interface (API) that provides a source-based view of program structure.

6. The method of claim 1, wherein creating the custom JSF component comprises generating both Java source code and related extensible markup language with a Java factory responsive to a plurality of annotations in the source code, the generated Java code including a unit test for the custom JSF component.

7. The method of claim 1, wherein creating the custom JSF component comprises:
performing steps for automatically generating a framework for the custom JSF component.

8. The method of claim 1, wherein the source code comprises another annotation designating a tag to be added to the JSF application, and wherein creating the custom JSF component comprises:
identifying the annotation designating the tag in the source code; and
in response to identifying the annotation designating the tag, generating Java code defining both a getter method and setter method corresponding to the tag designated by the annotation designating the tag.

9. The method of claim 1, comprising:
providing a web application to a client device, at least part of the web application including markup generated by a renderer of the custom JSF component based on an output of the custom JSF component.

10. The method of claim 1, wherein creating the custom JSF component comprises:
generating Java code defining tag handler class responsive to one or more annotations in the annotated source code;
generating Java code defining both getter and setter methods for an attribute of the custom JSF component responsive to one or more annotations in the annotated source code;
generating extensible markup language (XML) defining a tag library descriptor responsive to one or more annotations in the annotated source code;
generating XML to be added to the faces-config.xml file responsive to one or more annotations in the annotated source code; and
obtaining manual edits or configuration of the custom JSF component.

11. A non-transitory computer-readable medium containing computer-executable instructions to automatically generate a custom JavaServer Faces (JSF) component, the instructions operable when executed by one or more computers to effectuate operations comprising:
receiving annotated source code that defines a component class for the custom JSF component of a JSF application, the annotated source code being Java code of a Java class that defines behavior of a user interface element in a web page, the custom JSF component being callable by a custom tag in a markup language document at least in part defining the web page, the annotated source code including a Java annotation designated by an @ symbol prefix corresponding to a renderer; and
creating the custom JSF component, at least in part, by:
identifying the annotation in the received source code; and
in response to identifying the annotation, automatically generating a default decode method of the renderer that interprets inputs related to the custom JSF component and associating the renderer with the custom JSF component in a faces-config.xml file of the JSF application without manually adding a reference to the custom JSF component to the faces-config.xml file of the JSF application.

12. The computer-readable medium of claim 11, wherein automatically generating the custom JSF component comprises generating a framework for the custom JSF component and automatically adding a reference to the custom JSF component to the faces-config.xml file.

13. The computer-readable medium of claim 11, wherein the source code comprises another annotation identifying a data validator to validate inputs to the web page via the user interface element of the custom JSF component, and wherein automatically generating the custom JSF component comprises automatically registering the data validator as a validator usable to the JSF application in response to identifying the other annotation in the source code.

14. The computer-readable medium of claim 11, wherein the source code comprises another annotation corresponding to a renderer, and wherein automatically generating the custom JSF component comprises automatically associating the renderer with the custom JSF component in response to identifying the other annotation in the annotated source code.

15. The computer-readable medium of claim 11, wherein creating the custom JSF component comprises accessing a reflective application program interface (API) that provides a source-based view of program structure.

16. The computer-readable medium of claim 11, wherein creating the custom JSF component comprises generating both Java source code and related extensible markup language with a Java factory responsive to a plurality of annotations in the source code, the generated Java code including a unit test for the custom JSF component.

17. The computer-readable medium of claim 11, wherein creating the custom JSF component comprises:
performing steps for automatically generating a framework for the custom JSF component.

18. The computer-readable medium of claim 11, wherein the source code comprises another annotation designating a tag to be added to the JSF application, and wherein creating the custom JSF component comprises:
identifying the annotation designating the tag in the source code; and
in response to identifying the annotation designating the tag, generating Java code defining both a getter method and setter method corresponding to the tag designated by the annotation designating the tag.

19. The computer-readable medium of claim 11, comprising:
providing a web application to a client device, at least part of the web application including markup generated by a renderer of the custom JSF component based on an output of the custom JSF component.

20. The computer-readable medium of claim 11, wherein creating the custom JSF component comprises:
generating Java code defining tag handler class responsive to one or more annotations in the annotated source code;
generating Java code defining both getter and setter methods for an attribute of the custom JSF component responsive to one or more annotations in the annotated source code;
generating extensible markup language (XML) defining a tag library descriptor responsive to one or more annotations in the annotated source code; and generating XML to be added to the faces-config.xml file responsive to one or more annotations in the annotated source code.

* * * * *